Jan. 5, 1943. S. H. ATKINSON ET AL 2,307,443
VALVE
Filed Aug. 2, 1940
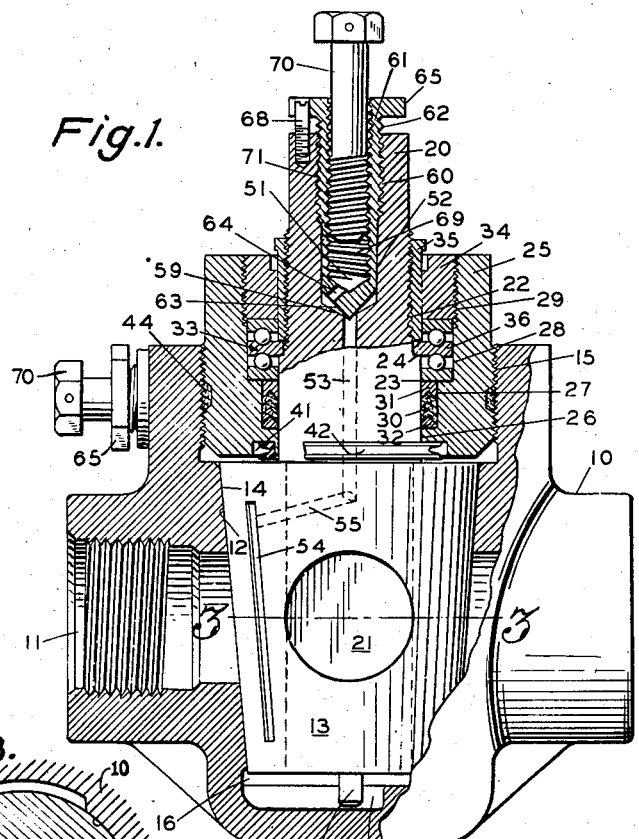
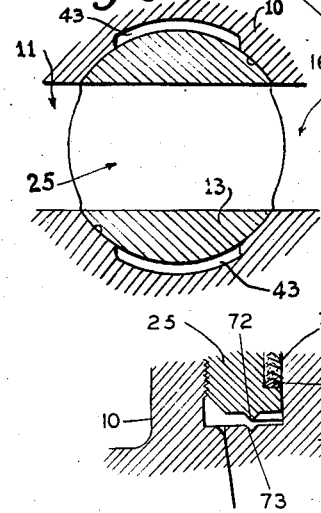
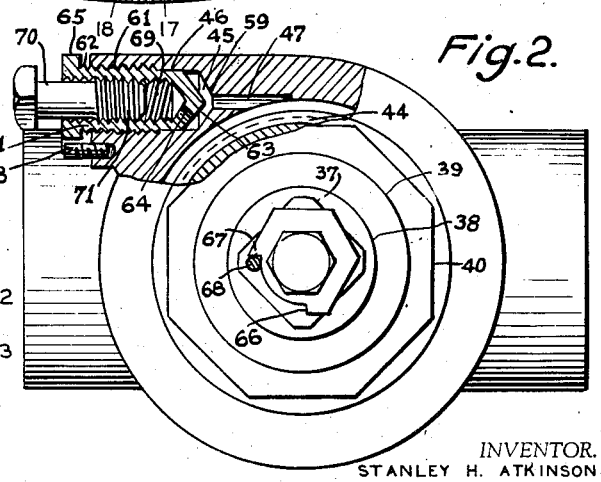
INVENTOR.
STANLEY H. ATKINSON
CLIFFORD P. GRAHAM
BY Robert M. McManigal
ATTORNEY.

Patented Jan. 5, 1943

2,307,443

UNITED STATES PATENT OFFICE 2,307,443

VALVE

Stanley H. Atkinson and Clifford P. Graham, Compton, Calif., assignors, by mesne assignments, to Merco-Nordstrom Valve Company, Pittsburgh, Pa., a corporation of Delaware Application August 2, 1940, Serial No. 349,878

6 Claims. (Cl. 251—103)

An object of our invention is to provide a plug valve which is easy to operate.

Another object of our invention is to provide a plug valve in which there is a minimum of wear between the valve plug and the valve body.

Another object of our invention is to provide a plug valve which is easy to seal.

Another object of our invention is to provide a plug valve in which the valve plug is adapted to make a close fit with the seating surface of the valve body.

Another object of our invention is to provide a plug valve which may be repacked while the plug valve is in use in a high pressure flow line with fluid under pressure flowing through the valve.

Another object of our invention is to provide a plug valve which may be sealed off between the retaining nut and the top of the valve plug when it is desired to replace the packing or the bearing around the plug stem while the plug valve is in use in a high pressure flow line without removing the valve from service.

Another object of our invention is to provide a plug valve which is economical to construct and to assemble and which is easy to repack without removing the plug valve from the high pressure flow line.

Our invention has many other objects, advantages, and features, some of which, with the foregoing, will be set forth at length in the following description where we shall outline one form of our invention, which we have selected for illustration in the drawing accompanying and forming a part of the present specification.

Figure 1 is a side elevational view of one form of our invention, partially in section.

Figure 2 is a plan view of the plug valve shown in Figure 1 with parts broken away, with both the plug valve and the lubricant means in the plug stem in closed position.

Figure 3 is a view taken along the line 3—3 of Figure 1 with the plug valve in open position.

Figure 4 is a fragmentary view of a modification of the secondary sealing means between the retaining nut and the top of the valve plug.

Referring to the drawing, the numeral 10 indicates a valve casing having a fluid passageway 11 and a longitudinal bore 12 with a valve plug 13 rotatable in the longitudinal bore 12. The peripheral surfaces of the bore 12 and the valve plug 13 cooperate to define a seating surface 14 for the valve plug. The upper portion of the bore 12 is counterbored and threaded as indicated at 15, and the lower portion of the bore 12 is counterbored as indicated at 16. The lower end of the bore 12 may also be provided with a lateral recess as indicated at 17 and the lower end of the valve plug may be provided with a depending stop 18 in order to limit the valve plug to a quarter turn. The lateral recess 17 is 90 degrees plus the diameter of the stop 18.

The valve plug is provided with a plug stem 20 and a transverse hole 21 adapted for alinement or non-alinement with the fluid passageway 11 when the valve plug is rotated. The plug stem 20 is provided with a threaded portion 22, and an enlarged portion 23, the upper end of which forms a shoulder 24.

Means are provided for retaining the valve plug in operative assembly in the valve casing, and for positively and definitely sealing the valve stem 20 with respect to the retaining means in such a manner than the sealing means can be replaced while the plug valve is in use in a flow line. As an instance of this arrangement a retaining nut 25 is adapted to be screwed into the upper threaded end 15 of the valve casing. The retaining nut is provided with a bore 26, counterbores 27 and 28 and a threaded counterbore 29. Packing 30 such as cup leather or Chevron packing is mounted between packing members 31 and 32 in counterbore 27. Double-thrust bearing 33 is mounted in counterbore 28 after which an upper bearing retaining nut 34 is threaded into the threaded counterbore 29. A lock collar 35 is then threaded around the threaded portion 22 of the plug stem until the lower end of the lock collar 35 engages the center bearing race 36 of the double thrust bearing 33, thereby retaining the valve plug in operative assembly in the retaining means.

The plug stem 20, lock collar 35, upper bearing retaining nut 34 and retaining nut 25 are provided with heads 37, 38, 39 and 40 respectively, which are adapted for engagement by suitable tools.

In order to replace the packing 30 or the double-thrust bearing 33 while the plug valve is in use on a fluid line, means are provided in order to effect a secondary seal between the retaining nut 25 and the top of the valve plug. As an instance of this arrangement, an annular recess 41 may be provided in the bottom of the retaining nut and a hydraulic packing ring 42 inserted in said annular recess 41.

A large part of the seating surface 14 of the longitudinal bore 12 is recessed as indicated at 43 in order to reduce the seating surface to a minimum and yet which is adequate. This arrangement has many advantages, some of them being that it reduces the friction between said parts, thereby making it easier to turn the valve plug, the valve plug can be made to fit closer in the seating surface 14, it is easier to obtain a good seal between said parts, there is less wear on said parts, and it makes for economy both in construction and operation.

Means are also provided for positively and definitely sealing off the retaining means from the valve casing. As an instance of this arrangement, a circumferential recess 44 may be provided in either the valve casing or the retaining nut 25. The circumferential recess 44 communicates with a sealing fluid chamber 45 which is provided in an enlarged lateral bore 46 in the upper part of the casing 10 by means of a lateral bore 47.

The plug stem 20 is provided with a lubricant chamber 51 which is provided in enlarged axial bore 52 in the upper end of said plug stem, and an axial bore 53 in the lower end of said plug stem.

Longitudinal grooves 54 are provided at the seating surface of the valve and are connected to the lubricant chamber 51 in the plug stem 20 by means of axial bore 53 and lateral bores 55.

Fluid chambers 45 and 51 may be similar in construction and are provided with means so that the fluid may be forced from said fluid chambers under pressure and preferably with check means in order to prevent the return of the fluid under pressure to the fluid chambers. Although check means of usual construction and mode of operation may be used, we prefer to use the check means illustrated in the drawing.

Said check means does not constitute a part of the present invention. It is the invention of one John W. MacClatchie, as embodied in copending application entitled, "Lubricating means," Serial No. 223,676, filed August 8, 1938. In this construction, the lower ends of the bores 46 and 52 form tapered seats 59, and the outer ends of said bores are provided with left-handed threads 60 into which cylinders 61 provided with like left-handed threads 62 are adapted to be screwed. Each cylinder 61 is provided with a tapered seating surface 63, the angle of said seating surface 63 to the axis of the bore in which the cylinder is threaded in each instance being no greater, and preferably appreciably smaller, than the angle formed by the tapered seat 59 to the axis of the bore in which the cylinder 61 is threaded. This is in order to provide definite, absolute, and positive shut-offs or seals when the cylinders 61 are in closed position.

The cylinders 61 are constructed with bores and thus provide fluid chambers 45 and 51. An opening 64 is provided through the tapered seating surface 63 of each cylinder 61 which opening is located as far from the center of the cylinder as convenient. As shown in Figure 3, the outer ends of the cylinders 61 may be provided with hexagonal nuts 65, part of which may be cut away as at 66 and 67. Stop pins 68 may be threaded into the top of the plug stem and the sides of the valve casing 10 within the periphery of the hexagonal nuts 65 in order to limit the movement of the cylinders 61 between closed and a limited open position.

The cylinders 61 are also provided with right-handed internal threads 69 to accommodate pressure screws 70 which are provided with similar threads 71.

In order to supply a sealing fluid under pressure to the circumferential recess 44 the cylinder 61 in lateral bore 46 is turned to the right by means of hexagonal nut 65 until the stop pin 68 is engaged, thereby raising said cylinder 61 from the tapered seat 59. By turning the pressure screw 70 in the fluid chamber 45 to the right, the sealing fluid in said chamber is forced through the opening 64, lateral bore 47, into the annular groove 44, thereby sealing off the retaining nut from the valve casing. After sufficient sealing fluid has been forced into said circumferential recess 44, the cylinder 61 in said lateral bore 46 is again turned to the left into closed position, and is adapted to remain in said position during the normal operation of said valve.

We prefer to use a semi-solid grease containing asbestos fibers as the sealing fluid, although any suitable sealing fluid may be used.

Lubricant is then forced into the grooves 54 between the plug and the casing in a similar manner. In other words, the cylinder 61 in the axial bore 52 in the plug stem is turned to the right by means of the hexagonal nut 65 until the stop pin 68 is engaged, thereby raising said cylinder 61 from its tapered seat 59. By turning the pressure screw 70 to the right, the lubricant is forced from the lubricant chamber 51 through the opening 64, axial bore 53, and the lateral bores 55 into the longitudinal grooves 54. After sufficient lubricant has been forced into said longitudinal grooves 54, the cylinder 61 is again turned to the left into closed position, and is adapted to remain in said position during normal operating conditions until it is again desired to lubricate said plug valve.

The valve is then ready for use, the plug stem 20 being rotated to open or close the valve plug by alining or non-alining transverse hole 14 with the fluid passageway 11.

The plug valve is constructed in such a manner that the retaining nut 25, bearing retaining nut 34 and the lock collar 35 maintain the double acting bearing 33 in position so that the thrust of the valve plug in either direction up or down is taken by the double acting bearing 33, thereby providing a valve plug which is easy to operate at all times.

The upward thrust of the plug due to the action of fluid under pressure flowing through the plug valve is taken by the upper race of bearing 33, against the upper bearing retaining nut 34 which is threaded to the retaining nut 25.

The downward thrust of the plug, induced by fluid under pressure when the plug valve is in closed position in a high pressure flow line, is taken by the lower race of bearing 33 against the shoulder of the retaining nut 25 formed at the lower end of the counterbore 28.

In order to replace the packing 30 or the double thrust bearing 33 while the plug valve is still in use in a high pressure flow line, the lock collar 35 and the bearing retaining nut 34 are released to allow the retaining nut 25 to be screwed into the valve casing 10 until the bottom of the retaining nut 25 is sealed off from the top of the valve plug by means of hydraulic packing 42. The lock collar 35 and then the upper bearing retaining nut 34 is unscrewed and removed, after which the double thrust bearing 33 and the packing 30 may be removed. After the packing 30, packing member 31, and double thrust bearing 33 are replaced, the upper bearing nut 34 and then the lock collar 35 are screwed into approximate position after which the retaining nut 25 is released and the valve plug again adjusted in the valve casing by proper adjustment of the retaining nut 25, bearing retaining nut 34 and the lock collar 35.

Another advantage of this construction is that fluid tending to escape between the valve stem 20 and the retaining nut 25 acts on the cup leather 30 in such a manner that it tends to maintain the correct setting of the valve plug in the valve casing, that is, the pressure exerted against the packing 30 tends to lift the plug from its seat.

The valve may be conveniently lubricated and the lubricant replenished during normal high pressure operating conditions at will, without interfering in any manner whatever with the operation of the valve.

When any cylinder 61 is in closed position, the pressure screw 70 in said closed cylinder may be removed and new lubricant or sealing fluid in the form of conventional sticks or otherwise inserted in the fluid chamber after which the pressure screw 70 is again screwed into said cylinder chamber. At all times during re-charging, the fluid in the plug valve below the lubricant chamber is positively and absolutely prevented from escaping through said fluid chambers.

In operating plug valves provided with said sealing means, the valve plug may be rotated as desired with a minimum of effort, even though the plug valve is placed in a high pressure flow line.

Figure 4 shows a modification of the secondary sealing means between the retaining nut 25 and the top of the valve plug 13. This modification is similar to the structure shown in Figure 1 except that instead of providing a packing ring 42 in a groove 41, the bottom of the retaining nut 25 is provided with a tongue 72 which is adapted to be seated in a groove 73. In normal position, there is a slight clearance between the lower surface of the tongue 72 and the upper surface of the valve plug 13. The operation of effecting a secondary seal between the retaining nut and the valve plug by means of this tongue and groove construction is similar to the operation of effecting a seal between said parts by means of the packing ring 42 and will therefore not be repeated herein.

While the invention has been particularly described with reference to a plug valve, it will be noted that the sealing means of our invention is applicable to any structure wherein fluid is to be sealed off between cooperating elements.

From the foregoing description taken in connection with the accompanying drawing, the uses, advantages, and operation of our invention will be readily understood by those skilled in the art to which the invention appertains. While we have described the form of our invention which we now consider to be the best embodiment thereof, we desire to have it understood that the article shown is merely illustrative and that the invention is not to be limited to the details disclosed herein, but is to be accorded the full scope of the appended claims.

We claim:

1. A valve comprising a valve casing, a valve plug rotatably mounted in said casing providing an annular shoulder and an operating stem extending therefrom, an annular member surrounding said operating stem, means to maintain said plug in working relation to said seat to prevent leakage of fluid from said fluid line around said operating stem, a secondary sealing means between said member and shoulder normally in inoperative position and means securing said member to said casing in spaced relation to said plug to allow axial movement of said member to engage said secondary sealing means and hold the plug.

2. A valve comprising a casing having a passageway therethrough for flow of fluid and a seat formed transversely of the passageway, a valve plug rotatably mounted in said seat providing an annular shoulder and an operating stem extending therefrom, a two-way ball thrust bearing assembly, means locking said ball thrust bearing assembly to said plug stem, an annular member surrounding said operating stem and having an internal shoulder engaging said thrust bearing assembly and supporting said plug, releasable means on said member preventing outward movement of said thrust bearing assembly, and means securing said member to said casing in spaced relation to said plug to allow axial movement of said member to engage said plug shoulder and hold the plug in position in its seat.

3. A valve comprising a casing having a passageway therethrough for flow of fluid and a seat formed transversely of the passageway, a valve plug rotatably mounted in said seat providing an annular shoulder and an operating stem extending therefrom, a two way ball thrust bearing assembly, means locking said ball thrust bearing assembly to said plug stem, an annular member surrounding said operating stem and having an internal shoulder on said member engaging said thrust bearing assembly and supporting said plug, releasable means on said member preventing outward movement of said thrust bearing assembly, packing means in said member surrounding the stem and retained in position by said thrust bearing assembly, and means securing said member to said casing in spaced relation to said plug to allow axial movement of said member to engage said plug shoulder and hold the plug in position in its seat.

4. A valve comprising a casing having a passageway therethrough for flow of fluid and a seat formed transversely of the passageway, a valve plug rotatably mounted in said seat providing an annular shoulder and an operating stem extending therefrom, a two-way ball thrust bearing assembly, means locking said ball thrust bearing assembly to said plug stem, an annular member surrounding said operating stem and having an internal shoulder engaging said thrust bearing assembly and supporting said plug, releasable means on said member preventing outward movement of said thrust bearing assembly, secondary sealing means between said member and plug shoulder, and means for sealing said member with respect to said casing in spaced relation to said plug to allow axial movement of said member to engage said secondary sealing means and hold the plug in position in its seat.

5. A valve comprising a casing having a passageway therethrough for flow of fluid and a seat formed transversely of the passageway, a valve plug rotatably mounted in said seat providing an annular shoulder and an operating stem extending therefrom, a two-way ball thrust bearing assembly, means locking said ball thrust bearing assembly to said plug stem, an annular member surrounding said operating stem and having an internal shoulder engaging said thrust bearing assembly and supporting said plug, releasable means on said member preventing outward movement of said thrust bearing assembly, packing means in said member surrounding said stem, secondary sealing means between said member and plug shoulder, and means for securing and sealing said member with respect to said casing in spaced relation to said plug to allow axial movement of said member to engage said secondary sealing means and hold the plug in position in its seat.

6. A valve comprising a casing having a passageway therethrough for flow of fluid and a seat formed transversely of the passageway, a valve plug rotatably mounted in said seat providing an annular shoulder and an operating stem extending therefrom, an annular member threaded into said casing surrounding said operating stem and providing an interior shoulder adjacent said stem, a ball thrust bearing assembly supported on said interior shoulder, means locking said ball thrust bearing assembly to said plug, means retaining said thrust bearing against said interior shoulder, packing means in said member surrounding the stem, secondary sealing means between said member and plug shoulder, and means for sealing the threaded joint between said member and casing to allow axial movement of said member to engage said secondary sealing means to hold the plug in position and prevent leakage of fluid so that the packing or thrust bearing may be replaced while the valve is in use.

STANLEY H. ATKINSON.
CLIFFORD P. GRAHAM.

CERTIFICATE OF CORRECTION.

Patent No. 2,307,443.  January 5, 1943.

STANLEY H. ATKINSON, ET AL.

It is hereby certified that error appears in the printed specification of the above numbered patent requiring correction as follows: Page 3, first column, line 70, claim 1, after "seat" insert --sealing means--; and that the said Letters Patent should be read with this correction therein that the same may conform to the record of the case in the Patent Office.

Signed and sealed this 9th day of March, A. D. 1943.

(Seal)

Henry Van Arsdale,
Acting Commissioner of Patents.